(12) United States Patent
Ishikawa et al.

(10) Patent No.: US 12,077,152 B2
(45) Date of Patent: Sep. 3, 2024

(54) TRAVEL CONTROL APPARATUS

(71) Applicant: Honda Motor Co., Ltd., Tokyo (JP)

(72) Inventors: Shota Ishikawa, Wako (JP); Nana Niibo, Wako (JP); Takeru Goto, Wako (JP); Shun Iwasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 17/578,348

(22) Filed: Jan. 18, 2022

(65) Prior Publication Data

US 2022/0234576 A1    Jul. 28, 2022

(30) Foreign Application Priority Data

Jan. 25, 2021 (JP) .................................. 2021-009538
Dec. 15, 2021 (JP) .................................. 2021-203418

(51) Int. Cl.
*B60W 30/09*    (2012.01)

(52) U.S. Cl.
CPC .......... *B60W 30/09* (2013.01); *B60W 2552/10* (2020.02); *B60W 2554/4041* (2020.02); *B60W 2554/4044* (2020.02)

(58) Field of Classification Search
CPC ............. B60W 30/09; B60W 2552/10; B60W 2554/4041; B60W 2554/4044; B60W 2554/80; B60W 2554/802; B60W 2554/804; B60W 30/12; B60W 30/18; B60W 2420/403; B60W 2420/408
See application file for complete search history.

(56) References Cited

U.S. PATENT DOCUMENTS

| 2015/0360721 | A1* | 12/2015 | Matsuno | ......... B60W 30/18163 |
| | | | | 701/1 |
| 2024/0010216 | A1* | 1/2024 | Kume | ................... B60W 30/12 |

FOREIGN PATENT DOCUMENTS

JP            2014129021 A       7/2014

* cited by examiner

*Primary Examiner* — Brian P Sweeney
(74) *Attorney, Agent, or Firm* — Duft & Bornsen, PC (57) ABSTRACT

A travel control apparatus includes a microprocessor configured to perform: recognizing a surrounding situation of a subject vehicle; generating a target path of the subject vehicle according to the surrounding situation; calculating a correction amount for correcting the target path in a direction away from a first other vehicle traveling in a first adjacent lane in the vehicle width direction, when the subject vehicle is predicted to pass a side of the first other vehicle or the first other vehicle is predicted to pass a side of the subject vehicle; when a second other vehicle traveling in a second adjacent lane is recognized, determining whether to correct the target path based on a traveling situation of the second other vehicle; and correcting the target path based on the correction amount when the target path is determined to be corrected in the determining.

15 Claims, 7 Drawing Sheets

TRAVEL CONTROL APPARATUS

CROSS-REFERENCE TO RELATED APPLICATION

This application is based upon and claims the benefit of priority from Japanese Patent Applications No. 2021-009538 filed on Jan. 25, 2021 and No. 2021-203418 filed on Dec. 15, 2021, the content of which are incorporated herein by reference.

BACKGROUND OF THE INVENTION

Field of the Invention

This invention relates to a travel control apparatus configured to a correct driving path a vehicle according to surrounding situation of the vehicle.

Description of the Related Art

As this type of apparatus, there has been known a conventional apparatus that corrects a steering angle in a direction away from the other vehicle when recognizing approach of the other vehicle traveling in a lane adjacent to a lane in which the vehicle is traveling (for example, JP 2014-129021 A).

However, if a driving path is simply corrected in a direction away from the other vehicle as in the apparatus disclosed in JP 2014-129021 A, an occupant may feel uncomfortable depending on a situation around the subject vehicle such as when the other vehicle is present in the direction.

SUMMARY OF THE INVENTION

An aspect of the present invention is a travel control apparatus including a microprocessor and a memory connected to the microprocessor. The microprocessor is configured to perform: recognizing a surrounding situation of a subject vehicle; generating a target path of the subject vehicle according to the surrounding situation recognized in the recognizing; calculating a correction amount for correcting the target path generated in the generating in a direction away from a first other vehicle in a vehicle width direction, the first other vehicle traveling in a first adjacent lane in which a traveling direction is the same as a traveling direction of a subject lane on which the subject vehicle travels and which is adjacent to one side of the subject lane, when the first other vehicle is recognized in the recognizing and the subject vehicle is predicted to pass a side of the first other vehicle or the first other vehicle is predicted to pass a side of the subject vehicle; when a second other vehicle traveling in a second adjacent lane which is adjacent to another side of the subject lane is recognized in the recognizing, determining whether to correct the target path based on a traveling situation of the second other vehicle; and correcting the target path based on the correction amount calculated in the calculating when the target path is determined to be corrected in the determining.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 10. A travel control apparatus according to the embodiment of the present invention can be applied to a vehicle having a driving support function or a self-driving capability. An example in which the travel control apparatus is applied to a vehicle (self-driving vehicle) having a self-driving capability will be described below. A vehicle to which the travel control apparatus according to the present embodiment is applied may be referred to as a subject vehicle to be distinguished from other vehicles. The subject vehicle can travel not only in a self-drive mode in which a driving operation by a driver is unnecessary, but also in a manual drive mode by the driving operation by the driver.

Figure 1:
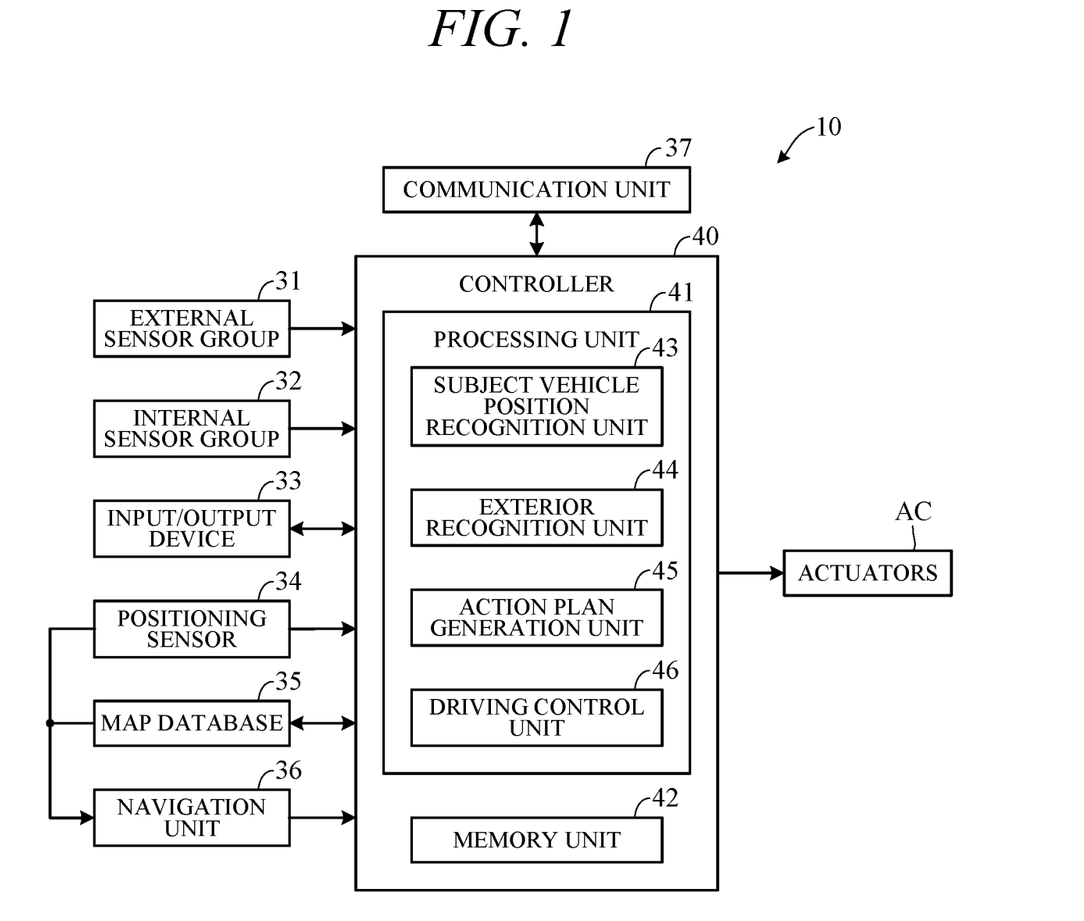
FIG. 1 is a block diagram schematically illustrating an overall configuration of a vehicle control system according to an embodiment of the present invention.

FIG. 1 is a block diagram schematically illustrating an overall configuration of a vehicle control system (vehicle control apparatus) 10 that controls a subject vehicle. As illustrated in FIG. 1, the vehicle control apparatus 10 mainly includes a controller 40, an external sensor group 31, an internal sensor group 32, an input/output device 33, a positioning sensor 34, a map database 35, a navigation unit 36, a communication unit 37, and a traveling actuator (hereinafter, simply referred to as an actuator) AC each electrically connected to the controller 40.

The external sensor group 31 is a generic term for a plurality of sensors that detect an external situation which is peripheral information of the subject vehicle. For example, the external sensor group 31 includes a LiDAR that measures scattered light with respect to irradiation light in all directions of the subject vehicle and measures a distance from the subject vehicle to surrounding obstacles, and a radar that detects other vehicles, obstacles, and the like around the subject vehicle by irradiating with electromagnetic waves and detecting reflected waves. Furthermore, for example, the external sensor group 31 includes a camera that is mounted on the subject vehicle, has an imaging element such as a CCD or a CMOS, and images a periphery (forward, backward and sideward) of the subject vehicle, a microphone that inputs a signal of sound from the periphery of the subject vehicle (hereinafter, simply referred to as a microphone), and the like. A signal detected by the external sensor group 31 and a signal input to the external sensor group 31 are transmitted to the controller 40.

The internal sensor group 32 is a generic term for a plurality of sensors that detect a traveling state of the subject vehicle and a state inside the vehicle. For example, the internal sensor group 32 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a rotation speed sensor that detects the rotation speed of a traveling drive source, a yaw rate sensor that detects a rotation angular speed around a vertical axis of the center of gravity of the subject vehicle, and the like. The internal sensor group 32 further includes a sensor that detects driver's driving operation in a manual drive mode, for example, operation of an accelerator pedal, operation of a brake pedal, operation of a steering wheel, and the like. A detection signal from the internal sensor group 32 is transmitted to the controller 40.

The input/output device 33 is a generic term for devices in which a command is input from a driver or information is output to the driver. For example, the input/output device 33 includes various switches to which the driver inputs various commands by operating an operation member, a microphone to which the driver inputs a command by voice, a display that provides information to the driver via a display image, a speaker that provides information to the driver by voice, and the like. The various switches include a manual automatic changeover switch (SW) that instructs either a self-drive mode or a manual drive mode.

The manual automatic changeover switch is configured as, for example, a switch manually operable by a driver, and outputs a changeover command to the self-drive mode in which a self-driving capability is enabled or the manual drive mode in which the self-driving capability is disabled according to a switch operation. Switching from the manual drive mode to the self-drive mode or switching from the self-drive mode to the manual drive mode can be instructed when a predetermined traveling condition is satisfied regardless of operation of the manual automatic changeover switch. That is, by automatically switching the manual automatic changeover switch, the mode can be automatically switched instead of manually switching.

The positioning sensor 34 is, for example, a GPS sensor, receives a positioning signal transmitted from a GPS satellite, and measures an absolute position (latitude, longitude, and the like) of the subject vehicle based on the received signal. The positioning sensor 34 includes not only the GPS sensor but also a sensor that performs positioning using radio waves transmitted from a quasi-zenith orbit satellite. A signal (a signal indicating a measurement result) from the positioning sensor 34 is transmitted to the controller 40.

The map database 35 is a device that stores general map information used for the navigation unit 36, and is constituted of, for example, a hard disk. The map information includes road position information, information on a road shape (curvature or the like), and position information on intersections and branch points. The map information stored in the map database 35 is different from highly accurate map information stored in a memory unit 42 of the controller 40.

The navigation unit 36 is a device that searches for a target route on a road to a destination input by a driver and provides guidance along the target route. The input of the destination and the guidance along the target route are performed via the input/output device 33. The target route is calculated based on a current position of the subject vehicle measured by the positioning sensor 34 and the map information stored in the map database 35.

The communication unit 37 communicates with various servers not illustrated via a network including a wireless communication network such as an Internet line, and acquires the map information, traffic information, and the like from the server periodically or at an arbitrary timing. The acquired map information is output to the map database 35 and the memory unit 42, and the map information is updated. The acquired traffic information includes traffic congestion information and traffic light information such as a remaining time until a traffic light changes from red to green.

The actuator AC is a device for operating various devices related to traveling operation of the subject vehicle. The actuator AC includes a brake actuator that operates the braking device, a steering actuator that drives the steering device, and the like. The actuator AC is a traveling actuator for controlling traveling of the subject vehicle. In a case where the traveling drive source is an engine, the actuator AC includes a throttle actuator that adjusts an opening (throttle opening) of a throttle valve of the engine. In a case where the traveling drive source is a traveling motor, the actuator AC includes the traveling motor. The actuator AC also includes a brake actuator that operates a braking device of the subject vehicle and a steering actuator that drives a steering device.

The controller 40 includes an electronic control unit (ECU). Although a plurality of ECUs having different functions such as an engine control ECU and a transmission control ECU can be separately provided, in FIG. 1, the controller 40 is illustrated as a set of these ECUs for convenience. The controller 40 includes a computer including a processing unit 41 such as a CPU (microprocessor), a memory unit 42 such as a ROM, a RAM, and a hard disk drive, and other peripheral circuits (not illustrated).

The memory unit 42 stores highly accurate detailed map information including information on a center position of a lane, information on a boundary of a lane position, and the like. More specifically, road information, traffic regulation information, address information, facility information, telephone number information, and other information are stored as the map information. The road information includes information indicating the type of road such as a highway, a toll road, and a national highway, and information such as the number of lanes of a road, the width of each lane, a road gradient, a three-dimensional coordinate position of the road, a curvature of a curve of the lane, positions of the merging point and branch point of the lane, a road sign, and the presence or absence of a median strip. The traffic regulation information includes information indicating that traveling on a lane is restricted or a road is closed due to construction or the like. The memory unit 42 also stores information such as a shift map (shift diagram) serving as a reference of shift operation, various control programs, and a threshold used in the programs.

The processing unit 41 includes a subject vehicle position recognition unit 43, an exterior environment recognition unit 44, an action plan generation unit 45, and a driving control unit 46 as functional configurations related to automatic travel.

The subject vehicle position recognition unit 43 recognizes the position (subject vehicle position) of the subject vehicle on a map based on the position information of the subject vehicle received by the positioning sensor 34 and the map information of the map database 35. The subject vehicle position recognition unit 43 may recognize the subject vehicle position using the map information (information such as the shape of a building) stored in the memory unit 42 and the peripheral information of the subject vehicle detected by the external sensor group 31, whereby the subject vehicle position can be recognized with high accuracy. For example, the subject vehicle position recognition unit 43 can recognize the subject vehicle position using the map information stored in the memory unit 42 and the image data around the subject vehicle captured by the camera of the external sensor group 31. When the subject vehicle position can be measured by a sensor installed on the road or outside a road side, the subject vehicle position can be recognized with high accuracy by communicating with the sensor via the communication unit 37.

The exterior environment recognition unit 44 recognizes an external situation around the subject vehicle based on the signal from the external sensor group 31 such as a LiDAR, a radar, and a camera. For example, the exterior environment recognition unit 44 recognizes the position, speed, and acceleration of a surrounding vehicle (a forward vehicle or a rearward vehicle) traveling around the subject vehicle, the position of a surrounding vehicle stopped or parked around the subject vehicle, and the positions and states of other objects. Other objects include signs, traffic lights, road boundaries, road stop lines, buildings, guardrails, utility poles, signboards, pedestrians, bicycles, and the like. The states of other objects include a color of a traffic light (red, green, yellow), the moving speed and direction of a pedestrian or a bicycle, and the like.

The action plan generation unit 45 generates a driving path (target path) of the subject vehicle from a current point of time to a predetermined time ahead based on, for example, the target route calculated by the navigation unit 36, the subject vehicle position recognized by the subject vehicle position recognition unit 43, and the external situation recognized by the exterior environment recognition unit 44. When there are a plurality of paths that are candidates for the target path on the target route, the action plan generation unit 45 selects, from among the plurality of paths, an optimal path that satisfies criteria such as compliance with laws and regulations and efficient and safe traveling, and sets the selected path as the target path. Then, the action plan generation unit 45 generates an action plan corresponding to the generated target path.

The action plan includes travel plan data set for each unit time Δt from a current point of time to a predetermined time T ahead, that is, travel plan data set in association with a time for each unit time Δt. The travel plan data includes position data of the subject vehicle and vehicle state data for each unit time. The position data is, for example, data of a target point indicating a two-dimensional coordinate position on the road, and the vehicle state data is vehicle speed data indicating the vehicle speed, direction data indicating the direction of the subject vehicle, or the like. The travel plan is updated every unit time.

The action plan generation unit 45 generates the target path by connecting the position data for each unit time Δt from the current point of time to the predetermined time T ahead in time order. At this time, the acceleration (target acceleration) for each unit time Δt is calculated based on the vehicle speed (target vehicle speed) of each target point for each unit time Δt on the target path. That is, the action plan generation unit 45 calculates the target vehicle speed and the target acceleration. The target acceleration may be calculated by the driving control unit 46.

When the action plan generation unit 45 generates the target path, the action plan generation unit 45 first determines a travel mode. Specifically, the travel mode is determined, such as following traveling for following a forward vehicle, overtaking traveling for overtaking the forward vehicle, lane change traveling for changing a traveling lane, merging traveling for merging into a main line of a highway or a toll road, lane keeping traveling for keeping the lane so as not to deviate from the traveling lane, constant speed traveling, deceleration traveling, or acceleration traveling. Then, the target path is generated based on the travel mode.

In the self-drive mode, the driving control unit 46 controls each of the actuators AC so that the subject vehicle travels along the target path generated by the action plan generation unit 45. That is, the throttle actuator, the shift actuator, the brake actuator, the steering actuator, and the like are controlled so that the subject vehicle passes through a target point P for each unit time.

More specifically, the driving control unit 46 calculates a requested driving force for obtaining the target acceleration for each unit time calculated by the action plan generation unit 45 in consideration of travel resistance determined by a road gradient or the like in the self-drive mode. Then, for example, the actuator AC is feedback controlled so that an actual acceleration detected by the internal sensor group 32 becomes the target acceleration. That is, the actuator AC is controlled so that the subject vehicle travels at the target vehicle speed and the target acceleration. In the manual drive mode, the driving control unit 46 controls each of the actuators AC in accordance with a travel command (accelerator opening or the like) from the driver acquired by the internal sensor group 32.

Figure 2A:
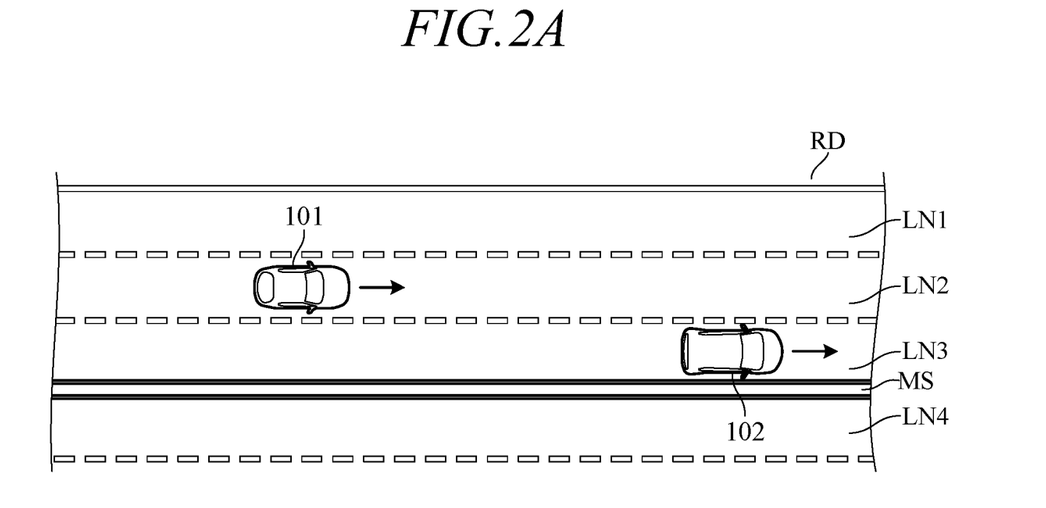
FIG. 2A is a diagram illustrating an example of a road situation.

As illustrated in FIG. 2A, when the other vehicle 102 is traveling on a lane (adjacent lane) LN3 adjacent to one side of a lane (traveling lane) LN2 on which the subject vehicle 101 travels on a road RD of three-lane left-hand traffic on one side, when a relative speed of the subject vehicle 101 with respect to the other vehicle 102 is equal to or higher than a predetermined speed, the subject vehicle 101 passes a side of the other vehicle 102. At this time, if the distance in the vehicle width direction between the subject vehicle 101 and the other vehicle 102 is not sufficiently secured, the subject vehicle 101 approaches the other vehicle 102 when the subject vehicle 101 passes the side of the other vehicle 102, and the occupant of the subject vehicle 101 may feel uncomfortable. The lane LN4 in the drawing is an opposite lane, and a median strip MS is provided between the lane LN4 and the lane LN3.

Figure 2B:
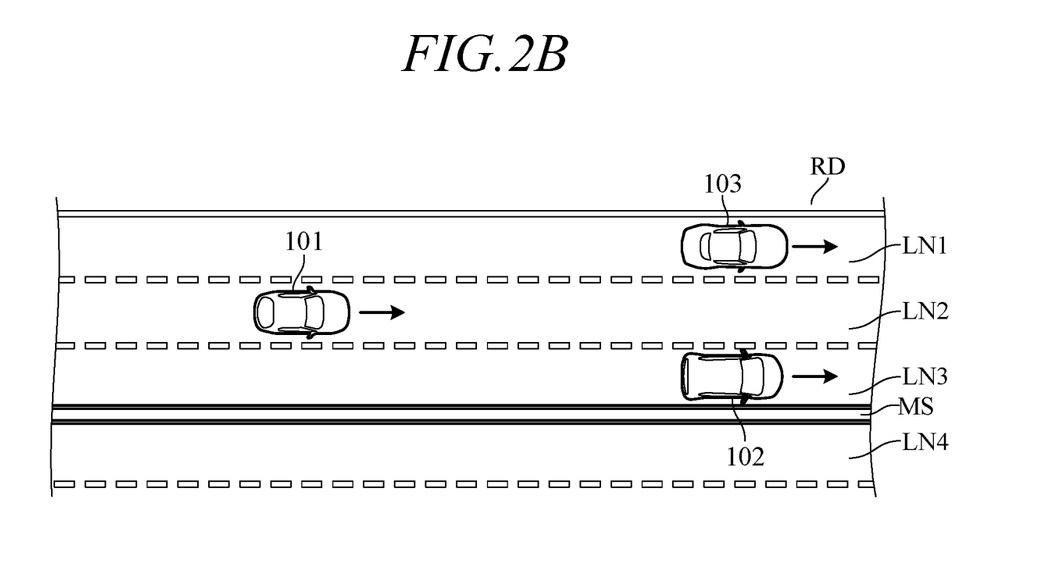
FIG. 2B is a diagram illustrating another example of a road situation.

On the other hand, by moving the driving path of the subject vehicle 101 to the left side (the upper side in the drawing) so that the distance in the vehicle width direction between the subject vehicle 101 and the other vehicle 102 is sufficiently secured, the uncomfortable feeling of the occupant as described above can be reduced. However, as illustrated in FIG. 2B, when the other vehicle 103 is present in the lane (adjacent lane) LN1 adjacent to the other side of the traveling lane LN2 of the subject vehicle 101, if the driving path of the subject vehicle 101 is moved to the left side, the subject vehicle 101 and the other vehicle 103 approach each other, and thus an occupant of the subject vehicle 101 may feel uncomfortable due to the approach. Therefore, in the present embodiment, the travel control apparatus is configured as below so as to reduce the uncomfortable feeling of the occupant due to the approach to the surrounding vehicle when passing the side of the surrounding vehicle.

Figure 3:
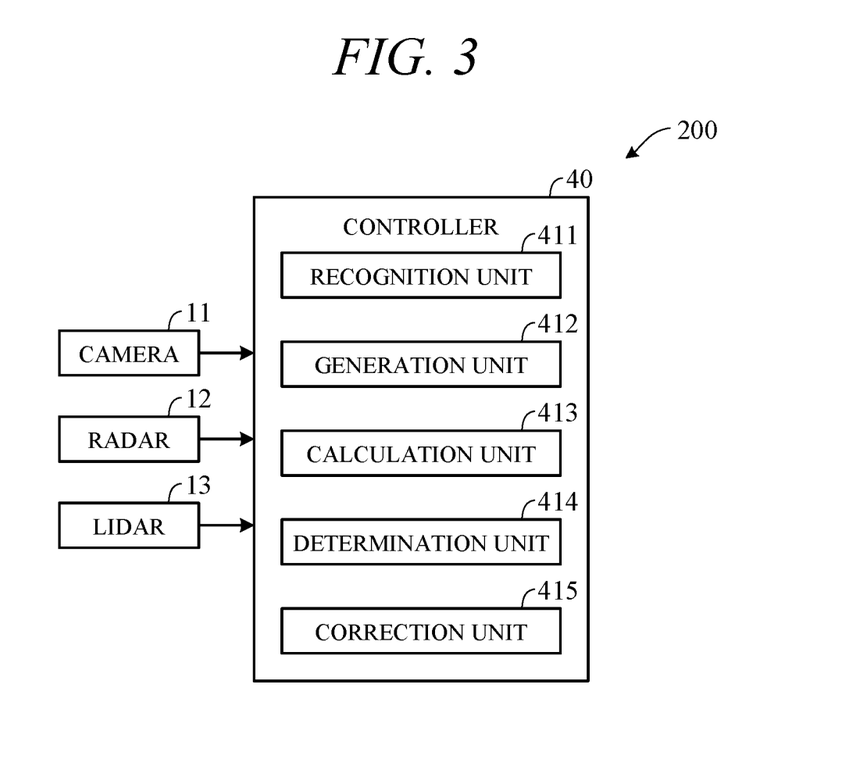
FIG. 3 is a block diagram illustrating a main part configuration of a travel control apparatus according to an embodiment of the present invention.

FIG. 3 is a block diagram illustrating a main part configuration of a travel control apparatus 200 according to the embodiment of the present invention. The travel control apparatus 200 constitutes a part of the vehicle control apparatus 10 of FIG. 1. As illustrated in FIG. 3, the travel control apparatus 200 includes a controller 40, a camera 11, a radar 12, and a LiDAR 13.

The camera 11 is a monocular camera having an imaging element (image sensor) such as a CCD or a CMOS, and constitutes a part of the external sensor group 31 in FIG. 1. The camera 11 may be a stereo camera. The camera 11 is attached to, for example, a predetermined position in the front of the subject vehicle 101, continuously captures an image of a space in front of the subject vehicle 101, and acquires an image (camera image) of an object. The object includes, for example, the other vehicles 102, 103 illustrated in FIG. 2B. The camera 11 outputs image data including the camera image to the controller 40. The radar 12 is mounted on the subject vehicle 101 and detects vehicles, obstacles, and the like around the subject vehicle 101 by irradiating with electromagnetic waves and detecting reflected waves. The radar 12 outputs a detection value (detection data) to the controller 40. The LiDAR 13 is mounted on the subject vehicle 101, and measures scattered light with respect to irradiation light in all directions of the subject vehicle 101 and detects a distance from the subject vehicle 101 to surrounding vehicles and obstacles. The LiDAR 13 outputs a detection value (detection data) to the controller 40.

As illustrated in FIG. 3, the controller 40 includes a recognition unit 411, a generation unit 412, a calculation unit 413, a determination unit 414, and a correction unit 415 as functional configurations which the processing unit 41 is responsible for. The recognition unit 411 is configured by, for example, the exterior environment recognition unit 44 in FIG. 1. The generation unit 412, the calculation unit 413, the determination unit 414, and the correction unit 415 are configured by, for example, the action plan generation unit 45 in FIG. 1. Here, each component will be described by taking, as an example, a case where the subject vehicle 101 is traveling in the traveling lane LN2 of FIG. 2B.

The recognition unit 411 recognizes the surrounding situation of the subject vehicle 101 based on the image data from the camera 11, the detection data from the radar 12, and the detection data from the LiDAR 13. The generation unit 412 generates a target path of the subject vehicle from the current point of time to a predetermined time T ahead according to the surrounding situation recognized by the recognition unit 411. When the recognition unit 411 recognizes the other vehicle 102 traveling on the lane LN3 adjacent to one side of the traveling lane LN2 of the subject vehicle 101 and the subject vehicle 101 is predicted to pass the side of the other vehicle 102, the calculation unit 413 calculates a correction amount for correcting the target path generated by the generation unit 412 in a direction away from the other vehicle 102 in the vehicle width direction.

The correction amount is calculated by the following Formula (I). CA is a correction amount of the target path calculated by the calculation unit 413. LW is a width of the traveling lane of the subject vehicle 101. VW is a vehicle width of the subject vehicle 101. MG is a margin set in consideration of a recognition error or the like of a white line on a road. As the LW, a value recognized by the recognition unit 411 based on the image data from the camera 11 may be used, or a value obtained from the road information stored in the memory unit 42 may be used. When the width of the traveling lane of the subject vehicle 101 increases or decreases, the value of LW changes accordingly. In that case, CA is updated according to the change in the value of LW.

$$CA = LW/2 - VW/2 - MG \tag{I}$$

When the other vehicle 103 traveling on the lane LN1 adjacent to the other side of the traveling lane LN2 of the subject vehicle 101 is recognized by the recognition unit 411, the determination unit 414 determines whether to correct the target path of the subject vehicle 101 based on the traveling situation of the other vehicle 103.

Figure 4:
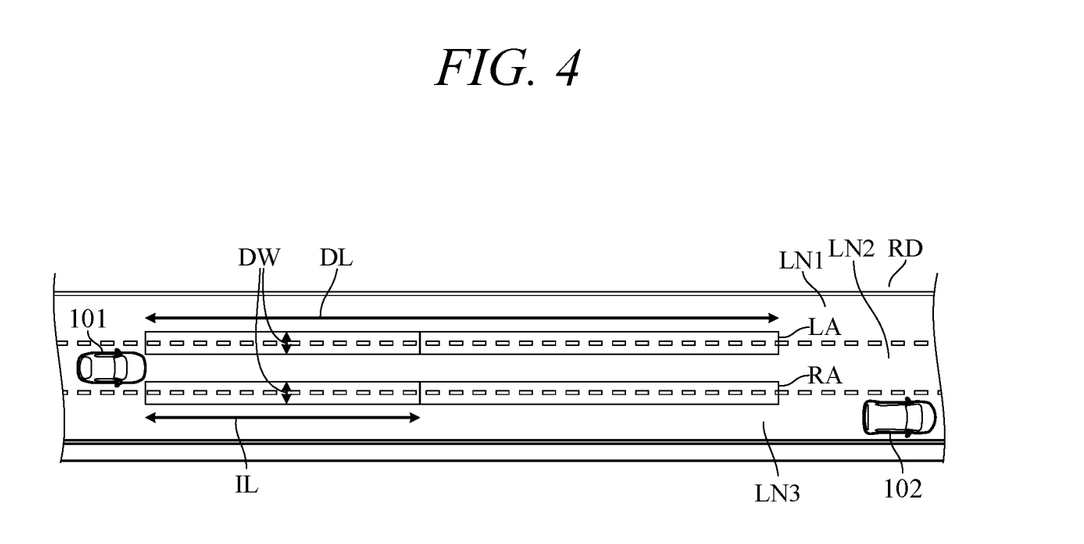
FIG. 4 is a diagram illustrating an example of a determination area.

FIG. 4 is a diagram illustrating an example of a determination area for determining (deciding) whether to correct the target path. When the relative speed of the other vehicle 102 recognized by the recognition unit 411 is equal to or higher than a threshold and the position of the other vehicle 102 at a predetermined time point (a time point after the current time point) is included in the determination areas LA, RA, the determination unit 414 predicts that the subject vehicle 101 passes the side of the other vehicle 102 and determines to correct the target path. At this time, the determination unit 414 determines whether a time to collision (TTC) with the other vehicle 102 is less than a second threshold, in addition to whether a relative speed with respect to the other vehicle 102 is equal to or higher than a threshold (first threshold). When the TTC with the other vehicle 102 is less than the second threshold, the determination unit 414 determines that the correction of the target path is not in time, and determines not to correct the target path. That is, the determination unit 414 determines to correct the target path when it is predicted that the subject vehicle 101 passes through the side of the other vehicle 102 after the lapse of time equal to or longer than the minimum time required for completing the correction of the target path (correction to change the target path to a direction away from the other vehicle 102 in the vehicle width direction), and determines not to correct the target path when it is not predicted that the subject vehicle passes the side, that is, when it is determined that the correction of the target path is not in time. The determination areas LA, RA are areas whose length in the front-rear direction (the length of the subject vehicle 101 in the traveling direction, that is, the length in the left-right direction in FIG. 4) is DL and whose length in the left-right direction (the length of the subject vehicle 101 in the vehicle width direction, that is, the length in the vertical direction in FIG. 4) is DW. DW is set in advance based on a recognition error of the recognition unit 411 and a control error of the driving control unit 46. DL is set based on a moving distance of the subject vehicle 101 from the current time point to a time point after a first predetermined time (≤predetermined time T). Hereinafter, the determination areas LA, RA will be described as two-dimensional areas for simplification of description, but the determination areas LA, RA may be three-dimensional areas having a height. When the position of the other vehicle 102 at the predetermined time point is included in an area (hereinafter, referred to as a correction prohibition area) within a distance IL from the subject vehicle 101 in the determination areas LA, RA, it is determined that the target path is not corrected. IL is set based on a moving distance of the subject vehicle 101 from the current time point to a time point after a second predetermined time (<first predetermined time). This suppresses uncomfortable feeling and discomfort to the occupant caused by sudden steering. Hereinafter, an area other than the correction prohibition area in the determination areas LA, RA is referred to as a correction target area.

When the determination unit 414 determines to correct the target path, the correction unit 415 corrects the target path based on the correction amount calculated by the calculation unit 413. Here, correction of the target path by the correction unit 415 will be described. First, correction of the target path when the other vehicle is recognized only in the lane LN3 adjacent to one side of the traveling lane LN2 of the subject vehicle 101 will be described. FIGS. 5A to 5D are diagrams for explaining correction of the target path.

Figure 5A:
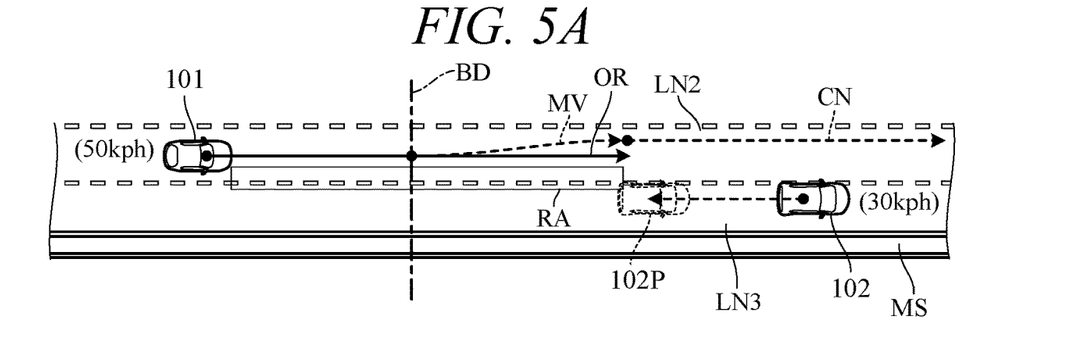
FIG. 5A is a diagram illustrating an example of a positional relationship between vehicles.

FIG. 5A illustrates the subject vehicle 101 traveling on the lane LN2 and the other vehicle 102 traveling on the lane LN3. It is assumed that the traveling speed of the subject vehicle 101 is 50 kph and the traveling speed of the other vehicle 102 is 30 kph. That is, the relative speed of the subject vehicle 101 with respect to the other vehicle 102 is 20 kph (=50 kph −30 kph). A solid arrow line OR in the drawing represents a target path from the current time (hereinafter, time point t0) to a predetermined time T ahead of the subject vehicle 101. The other vehicle 102P drawn by a broken line in the drawing schematically represents the other vehicle 102 at a predetermined time point. The predetermined time point is a time point that is a second predetermined time ahead from the current time point. A dashed-dotted line BD in the drawing represents a boundary between the correction prohibition area and the correction target area of the determination area RA. In the example illustrated in FIG. 5A, since a part of the other vehicle 102P is included in the determination area RA, when the relative speed of the subject vehicle 101 with respect to the other vehicle 102 is equal to or higher than the threshold, the target path OR is corrected to the target path indicated by the broken arrow line MV. When the TTC is considered together with the relative speed, the target path OR is corrected to the target path indicated by the broken arrow line MV when the relative speed is equal to or higher than the first threshold and the TTC is less than the second threshold. A broken line CN in the drawing represents a correction continuation path. The correction continuation path is a target path generated by the generation unit 412 when the target path is corrected by the correction unit 415, and is a target path for causing the subject vehicle 101 to continuously travel at the position (position in the vehicle width direction) of the end point of the corrected target path MV. In FIGS. 5A to 5D, the determination area LA is not illustrated.

Figure 5B:
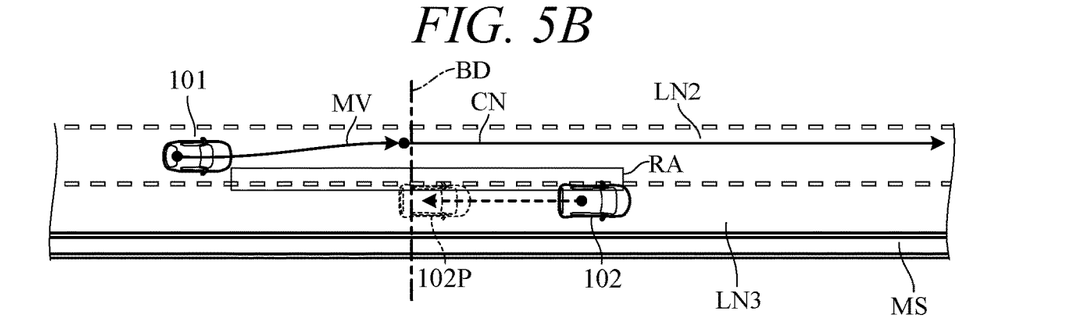
FIG. 5B is a diagram illustrating an example of a positional relationship between vehicles at a time point after FIG. 5A.

FIG. 5B illustrates a positional relationship between the subject vehicle 101 and the other vehicle 102 at a time point (hereinafter, time point t1) after the time point t0. As illustrated in FIG. 5B, when the subject vehicle 101 reaches the start point of the corrected target path MV, the subject vehicle 101 starts lateral movement (movement in the upward direction in the drawing) to separate from the other vehicle 102 along the target path MV. Hereinafter, the target path MV is also referred to as a lateral movement path. When the boundary BD is located between the start point and the end point of the lateral movement path MV, the generation unit 412 does not generate the target path.

Figure 5C:
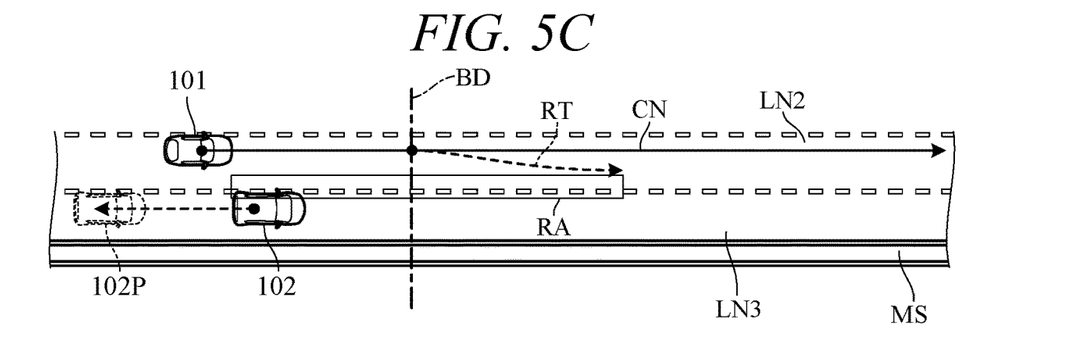
FIG. 5C is a diagram illustrating an example of a positional relationship between vehicles at a time point after FIG. 5B.

FIG. 5C illustrates a positional relationship between the subject vehicle 101 and the other vehicle 102 at a time point (hereinafter, time point t2) after the time point t1. As illustrated in FIG. 5C, when the position of the other vehicle 102 P (the other vehicle 102 at the time point second predetermined time ahead from the time point t2) deviates from the determination area RA, the generation unit 412 generates a target path (hereinafter, referred to as a return path) for returning the subject vehicle 101 to the original position (position in the vehicle width direction). A broken arrow line RT in the drawing indicates a return path of the subject vehicle 101. When the other vehicle 102 moves rightward (downward in the drawing) and thus the other vehicle 102 deviates from the determination area RA, the generation unit 412 generates a return path in the same manner.

Figure 5D:
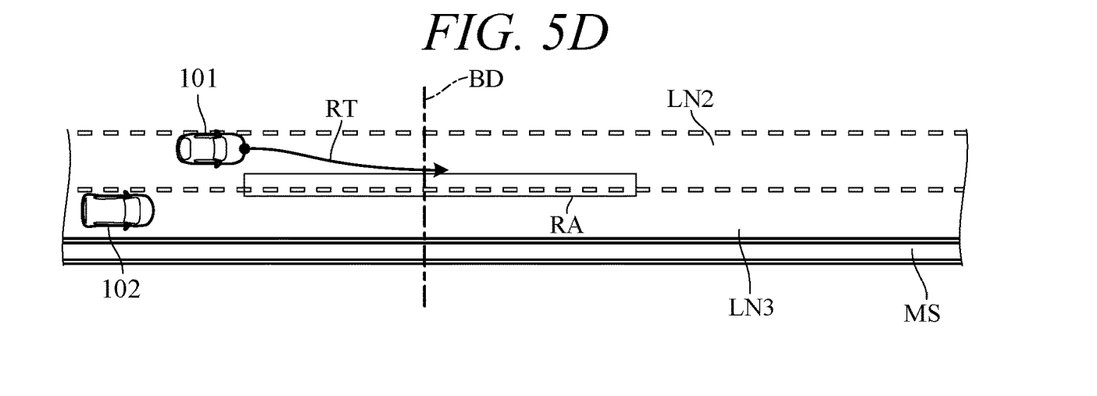
FIG. 5D is a diagram illustrating an example of a positional relationship between vehicles at a time point after FIG. 5C.

FIG. 5D illustrates a positional relationship between the subject vehicle 101 and the other vehicle 102 at a time point (hereinafter, time point t3) after the time point t2. As illustrated in FIG. 5D, when the subject vehicle 101 reaches the start point of the return path RT, the subject vehicle 101 starts lateral movement (movement in the downward direction in the drawing) along the return path RT and returns to the original position (position in the vehicle width direction). As described above, the target path of the subject vehicle 101 is corrected. As a result, the subject vehicle 110 can pass the side of the other vehicle 102 while avoiding approach to the other vehicle 102 in the vehicle width direction without causing a sudden change in travel control such as sudden steering.

Next, correction of the target path when the other vehicles (other vehicles 102, 103) are recognized in both the lane LN3 adjacent to one side of the traveling lane LN2 of the subject vehicle 101 and the lane LN1 adjacent to the other side of the traveling lane LN2 will be described. Here, a case where the other vehicle 102 is recognized in the lane LN3 adjacent to one side (right side) of the traveling lane LN2 of the subject vehicle 101, the relative speed of the subject vehicle 101 with respect to the other vehicle 102 is equal to or higher than the threshold, and the position of the other vehicle 102 at a predetermined time point (time point after the current time point) is included in the determination area RA is taken as an example. In this case, when the other vehicle is not recognized in the lane LN1 adjacent to the other side (left side) of the traveling lane LN2 of the subject vehicle 101, the target path of the subject vehicle 101 is corrected in a direction away from the other vehicle 102 in the vehicle width direction. However, when the other vehicle 103 is recognized in the lane LN1 as illustrated in FIG. 2B, if the target path of the subject vehicle 101 is corrected in a direction away from the other vehicle 102 in the vehicle width direction, the subject vehicle 101 and the other vehicle 103 may approach each other. Therefore, in order to avoid such approach, the determination unit 414 determines whether to correct the target path in a direction away from the other vehicle 102 in the vehicle width direction based on the traveling situation of the other vehicle 103. Specifically, based on the traveling position, traveling speed, traveling acceleration, and the like of the other vehicle 103 recognized by the recognition unit 411, the determination unit 414 predicts the distance (hereinafter, referred to as an approach distance) at which the subject vehicle 101 and the other vehicle 103 come closest to each other when the subject vehicle 101 travels along the corrected target path (correction of changing the target path in a direction away from the other vehicle 102 in the vehicle width direction). At this time, the determination unit 414 predicts the approach distance in the vehicle width direction and the approach distance in the traveling direction. The determination unit 414 determines to correct the target path when the predicted approach distance between the subject vehicle 101 and the other vehicle 103 in the vehicle width direction is equal to or greater than a first predetermined value, or when the predicted approach distance between the subject vehicle 101 and the other vehicle 103 in the traveling direction is equal to or greater than a second predetermined value. On the other hand, the determination unit 414 determines not to correct the target path when the predicted approach distance between the subject vehicle 101 and the other vehicle 103 in the vehicle width direction is less than the first predetermined value, and when the approach distance between the subject vehicle 101 and the other vehicle 103 in the traveling direction is less than the second predetermined value. The predetermined values (the first predetermined value and the second predetermined value) are set in advance based on a result of sensory evaluation or the like. Different values may be set for the first predetermined value and the second predetermined value.

Figure 6:
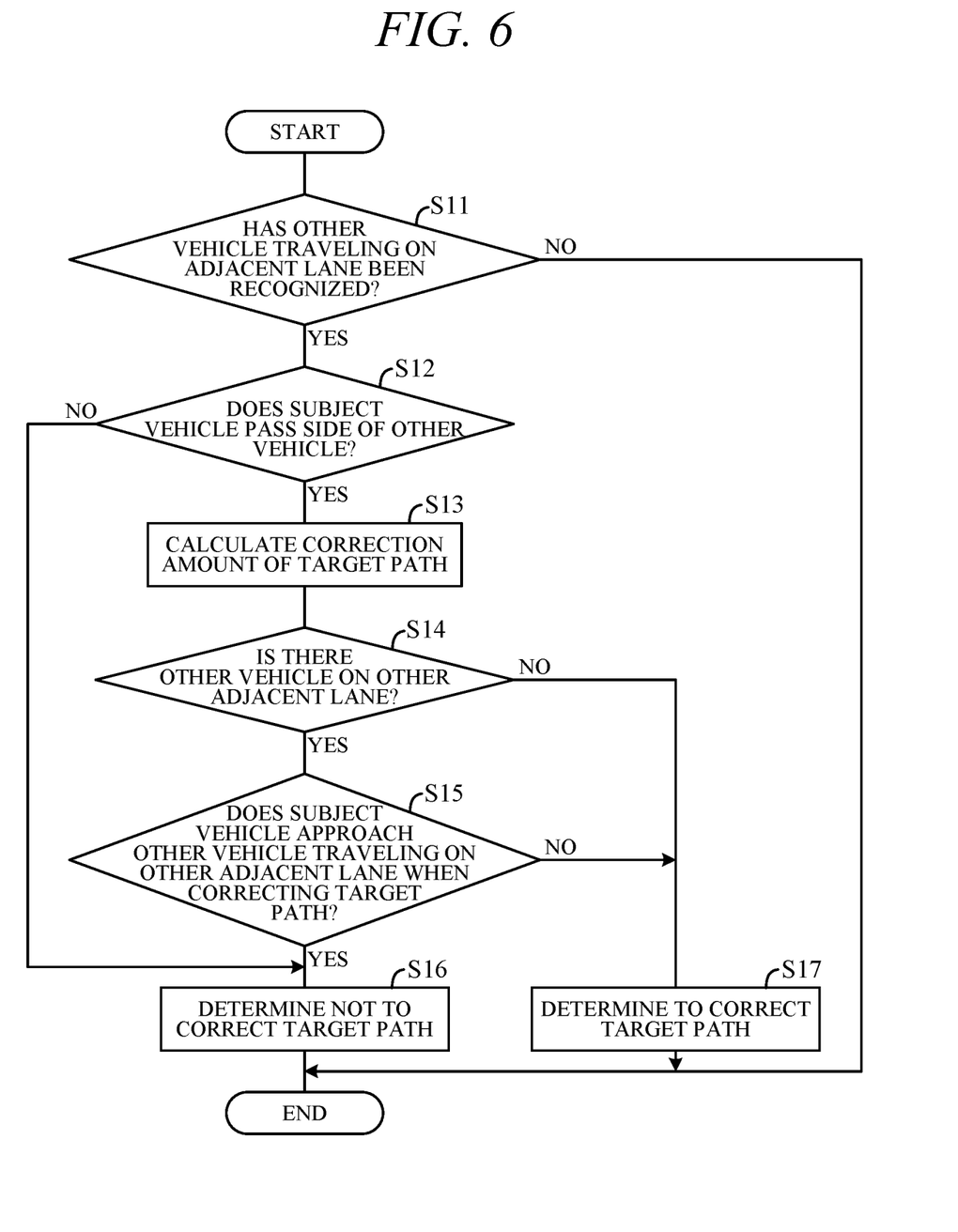
FIG. 6 is a flowchart showing an example of processing executed by the CPU of the controller in FIG. 3.

FIG. 6 is a flowchart showing an example of processing executed by the CPU of the controller 40 in FIG. 3 according to a prestored program. The processing illustrated in the flowchart is started, for example when the controller 40 is powered on, and is repeated at a predetermined cycle.

First, in step S11, the surrounding situation of the subject vehicle 101 is recognized. Specifically, it is determined whether or not the other vehicle (hereinafter, may be referred to as a first other vehicle) traveling in a lane adjacent to one side of the traveling lane of the subject vehicle 101 is recognized in front of the subject vehicle 101. If the determination is negative in step S11, the processing ends. On the other hand, if the determination is affirmative in step S11, it is determined in step S12 whether or not the subject vehicle 101 passes the side of the first other vehicle. More specifically, it is determined whether or not the relative speed of the subject vehicle 101 with respect to the first other vehicle is equal to or higher than a predetermined speed. If the determination is negative in step S12, the processing proceeds to step S16. If the determination is affirmative in step S12, in step S13, a correction amount for correcting the target path of the subject vehicle 101 in a direction away from the first other vehicle in the vehicle width direction is calculated. In step S14, it is determined whether or not the other vehicle (hereinafter, may be referred to as a second other vehicle) traveling in the other adjacent lane of the traveling lane of the subject vehicle 101 is recognized. If the determination is negative in step S14, the processing proceeds to step S17. If the determination is affirmative in step S14, it is determined in step S15 whether or not the subject vehicle 101 approaches the second other vehicle when the target path of the subject vehicle 101 is corrected based on the correction amount calculated in step S13. That is, when the subject vehicle 101 travels along the corrected target path, it is determined whether or not a distance (approach distance) at which the subject vehicle 101 and the second other vehicle come closest to each other is less than a predetermined value. If the determination is affirmative in step S15, it is determined in step S16 that the target path of the subject vehicle 101 is not corrected. On the other hand, if the determination is negative in step S15, it is determined in step S17 that the target path of the subject vehicle 101 is corrected.

Figure 7A:
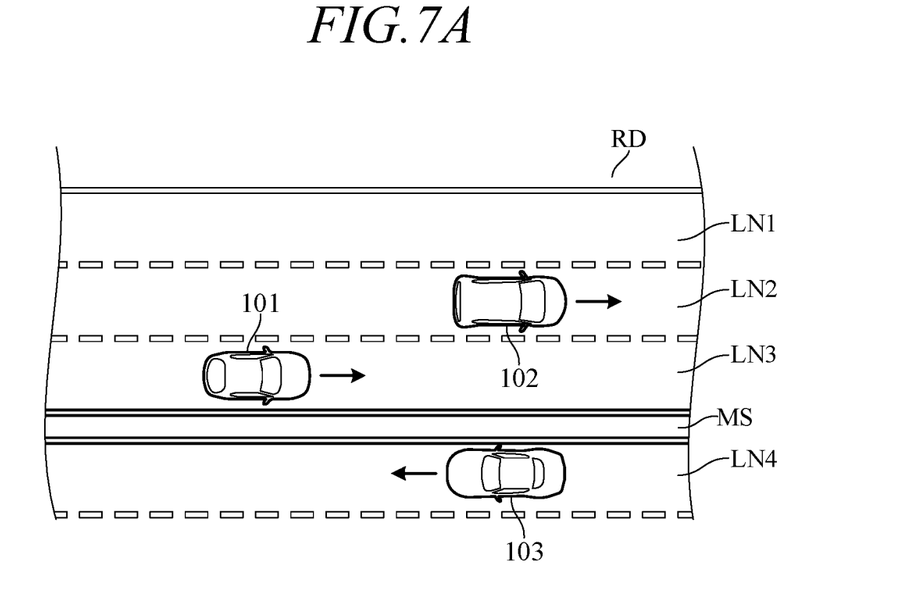
FIG. 7A is a diagram illustrating another example of a road situation.
Figure 7B:
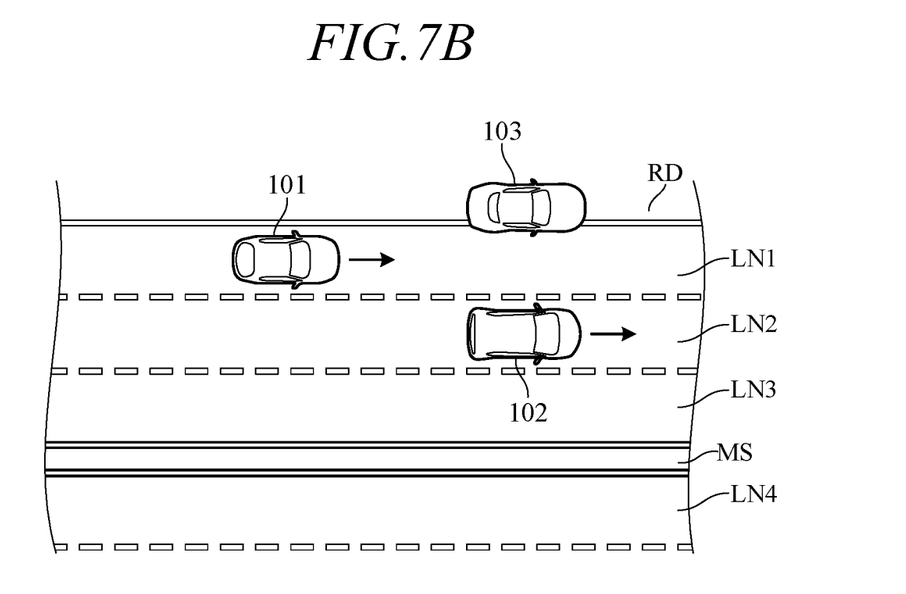
FIG. 7B is a diagram illustrating another example of a road situation.

As described above, whether the target path of the subject vehicle 101 is corrected is determined. When it is determined to correct the target path of the subject vehicle 101, correction of the target path as illustrated in FIGS. 5A to 5D is performed. However, as illustrated in FIG. 7A, on a road RD on which a median strip MS is provided between the traveling lane LN3 and the opposite lane LN4, when the subject vehicle 101 is traveling on the lane LN3, the first other vehicle (other vehicle 102) is traveling in the traveling lane LN2, and the second other vehicle (other vehicle 103) is an opposite vehicle traveling on the lane (opposite lane) LN4 opposite to the lane LN3, the processing proceeds to step S17 and it is determined to correct the target path without depending on the determination result of step S15, that is, without depending on the degree of approach between the subject vehicle 101 and the other vehicle 103. As a result, it is possible to prevent unnecessary suppression of the correction of the target path. As illustrated in FIG. 7B, when the second other vehicle (other vehicle 103) is stopped (parked or stopped) on a road shoulder or the like, the target path is not corrected. That is, the processing ends regardless of the determination results of steps S14, S15, and travel control for avoiding the other vehicle 103 that is stopped is performed. Description of the travel control performed at this time will be omitted.

According to the embodiment of the present invention, the following advantageous effects can be obtained:

(1) The travel control apparatus 200 includes: a recognition unit 411 that recognizes a surrounding situation of the subject vehicle 101; a generation unit 412 that generates a target path of the subject vehicle 101 according to the surrounding situation recognized by the recognition unit 411; a calculation unit 413 that calculates a correction amount for correcting the target path generated by the generation unit 412 in a direction away from a first other vehicle (the other vehicle 102 in FIG. 2B) in the vehicle width direction when the recognition unit 411 recognizes the first other vehicle that travels in a first adjacent lane (the lane LN3 in FIG. 2B) which is adjacent to one side of the subject lane (the lane LN2 in FIG. 2B) on which the subject vehicle 101 travels and in which the traveling direction is the same as that of the subject lane, and the subject vehicle 101 is predicted to pass a side of the first other vehicle; a determination unit 414 that determines whether or not to correct a target path based on a traveling situation of a second other vehicle (the other vehicle 411 in FIG. 2B) when the recognition unit 411 recognizes the second other vehicle (the other vehicle 103 in FIG. 2B) traveling in a second adjacent lane (the lane LN1 in FIG. 2B) adjacent to the other side of the subject lane; and a correction unit 415 that corrects the target path based on the correction amount calculated by the calculation unit 413 when the determination unit 414 determines to correct the target path. As a result, the driving path can be corrected in an appropriate manner according to the surrounding situation of the vehicle.

(2) The determination unit 414 predicts a distance (first approach distance) in the vehicle width direction and a distance (second approach distance) in the traveling direction at which the subject vehicle comes closest to the second other vehicle when the subject vehicle 101 travels along the target path corrected by the correction unit 415 based on the traveling situation of the second other vehicle, and determines not to correct the target path when the predicted first approach distance or second approach distance is less than a predetermined value. As a result, when there is the other vehicle in a lane adjacent to the other side of the traveling lane of the subject vehicle, it is determined whether or not to correct the target path in consideration of the degree of approach to the other vehicle. Accordingly, the driving path can be corrected in a more appropriate manner according to the surrounding situation of the vehicle.

(3) When the second adjacent lane in which the second other vehicle is traveling is the opposite lane (lane LN4 in FIG. 7A) of the subject lane in which the subject vehicle 101 is traveling and a separation zone (median strip MS in FIG. 7A) is provided between the subject lane and the opposite lane, the determination unit 414 determines not to correct the target path of the subject vehicle 101 even if the predicted first approach distance or second approach distance is less than a predetermined value. As a result, it is possible to prevent unnecessary suppression of the correction of the target path of the subject vehicle. Accordingly, the driving path can be corrected in a more appropriate manner according to the surrounding situation of the vehicle.

(4) The determination unit 414 sets, as a correction target area of the target path, a section between a first point at which the subject vehicle 101 reaches first predetermined time ahead and a second point at which the subject vehicle 101 reaches second predetermined time ahead shorter than the first predetermined time, and determines to correct the target path when the position of the first other vehicle after the second predetermined time is predicted to be included in the correction target area and the relative speed of the subject vehicle with respect to the first other vehicle is equal to or higher than a predetermined speed (first threshold). The determination unit 414 sets the section between the current position of the subject vehicle 101 and the second point as the correction prohibition area of the target path, and determines not to correct the target path when the position of the first other vehicle after the second predetermined time is predicted to be included in the correction prohibition area. This suppresses uncomfortable feeling and discomfort to the occupant caused by a sudden change in travel control such as sudden steering. Even when the position of the first other vehicle after the second predetermined time is predicted to be included in the correction target area and the relative speed of the subject vehicle 101 with respect to the first other vehicle is equal to or higher than the first threshold, the determination unit 414 determines not to correct the target path when the time to collision of the subject vehicle 101 with the first other vehicle is less than the second threshold value. As a result, it is possible to prevent the correction from being performed when the correction of the target path is not completed (cannot be made in time) before passing the side of the first other vehicle.

The above embodiment can be modified in various manners. Hereinafter, a modification will be described. In the above embodiment, when the position of the first other vehicle after the second predetermined time is predicted to be included in the correction target area and the relative speed of the subject vehicle with respect to the first other vehicle is equal to or higher than the first threshold, the determination unit 414 determines to correct the target path. However, the configuration of the determination unit is not limited thereto. For example, the determination unit may predict at predetermined time intervals whether the position of the first other vehicle after the second predetermined time is included in the correction target area, and may determine to correct the target path when the position of the first other vehicle after the second predetermined time is predicted to be included in the correction target area continuously a predetermined number of times.

In the above embodiment, the target path of the subject vehicle 101 is corrected based on the correction amount CA calculated by the above Formula (I). However, when the correction amount CA calculated in step S13 is 0, the processing may proceed to step S16 and it may be determined not to correct the target path of the subject vehicle 101.

In the above embodiment, the case where the relative speed of the subject vehicle 101 with respect to the other vehicle 102 does not change has been described as an example, but the target path may be corrected in accordance with the change in the speed of the other vehicle 102. For example, when the speed of the other vehicle 102 increases after the subject vehicle 101 laterally moves along the lateral movement path MV in FIG. 5B, the relative speed of the subject vehicle with respect to the other vehicle 102 becomes 0, and a state in which the distance between the two vehicles is constant continues, the correction continuation path may be repeatedly generated so that the subject vehicle 101 travels at the position after the lateral movement until the state is eliminated.

In the above embodiment, when the median strip MS is provided between the subject lane LN3 and the opposite lane LN4 as illustrated in FIG. 7A, the target path is corrected in a direction away from the other vehicle 103 (on the opposite lane LN4 side) regardless of the result of the determination in step S15, that is, regardless of the degree of approach between the subject vehicle 101 and the other vehicle 102 traveling on the opposite lane LN4.

Figure 8:
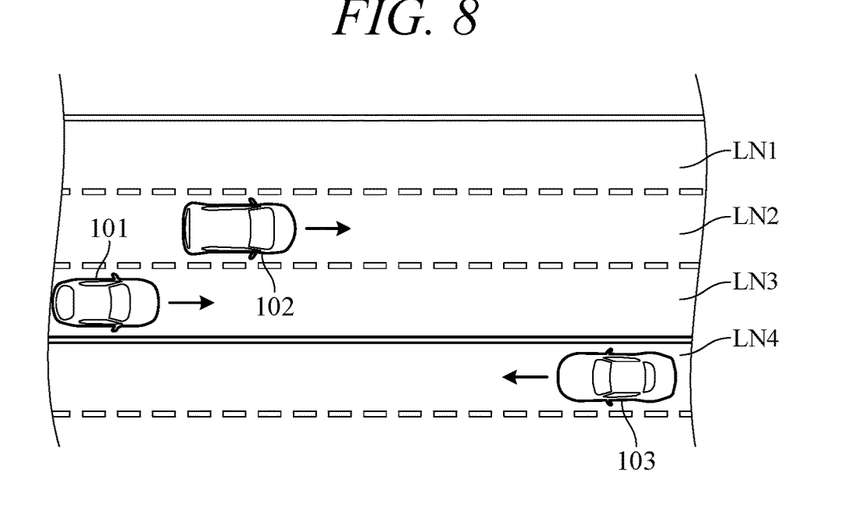
FIG. 8 is a diagram illustrating an example of a road at which a separation zone is not provided.

On the other hand, as illustrated in FIG. 8, when a separation zone is not provided between the subject lane LN3 and the opposite lane LN4, if the target path of the subject vehicle 101 is corrected in a direction away from the other vehicle 102, when the subject vehicle 101 approaches the other vehicle 103 in the opposite lane LN4, uncomfortable feeling and discomfort may be given to the occupant. Therefore, in order to cope with such a problem, when the other vehicle 103 traveling in the opposite lane LN4 is recognized in front of the subject vehicle 101 in step S14, the determination unit may determine whether or not to correct the target path based on the distance between the subject vehicle and the other vehicle 103.

Specifically, when the other vehicle 103 traveling in the opposite lane LN4 is recognized by the recognition unit 411 on a road where no separation zone is provided between the subject lane LN3 and the opposite lane LN4, the determination unit determines whether or not the distance between the subject vehicle 101 and the other vehicle 103 in the vehicle width direction at that time is equal to or greater than a third predetermined value. When the distance between the subject vehicle 101 and the other vehicle 103 in the vehicle width direction is equal to or greater than the third predetermined value, it is determined to correct the target path. The determination unit determines whether or not the distance in the traveling direction between the subject vehicle 101 and the other vehicle 103 at that time is equal to or greater than a fourth predetermined value. When the distance between the subject vehicle 101 and the other vehicle 103 in the traveling direction is equal to or greater than the fourth predetermined value, it is determined to correct the target path. The third predetermined value and the fourth predetermined value may be set in advance, or may be set based on the traveling position, traveling speed, traveling acceleration, and the like of the other vehicle 103 recognized by the recognition unit 411.

In the above embodiment, when it is determined that the subject vehicle 101 will approach the second other vehicle traveling in the other adjacent lane if the target path is corrected in the vehicle width direction in a direction away from the first other vehicle when the subject vehicle passes the side of the first other vehicle traveling in the adjacent lane (YES in S15), it is determined that the target path is not corrected (S16). On the other hand, even when the first other vehicle passes the side of the subject vehicle 101, the target path of the subject vehicle 101 is corrected in a direction away from the first other vehicle in the vehicle width direction, and the subject vehicle 101 may approach the second other vehicle traveling in the other adjacent lane. In order to cope with such a problem, the travel control apparatus 200 may be configured as follows.

Figure 9:
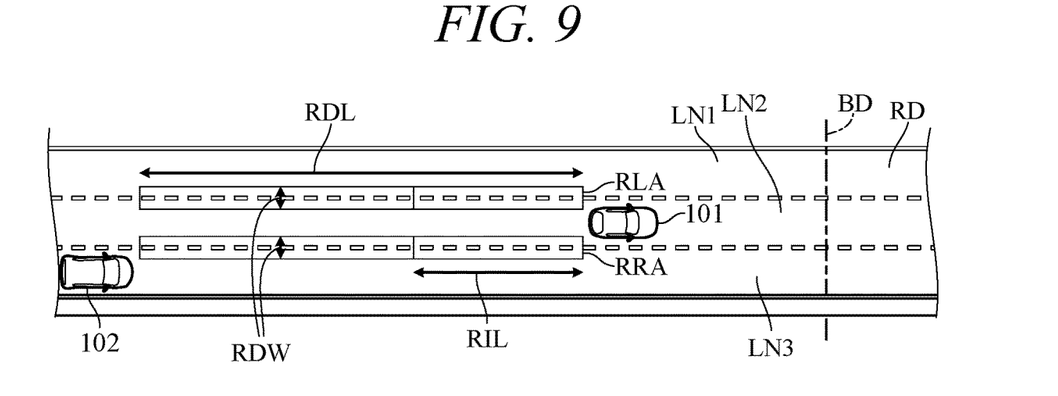
FIG. 9 is a diagram illustrating an example of a determination area according to a modification of the embodiment of the present invention.

FIG. 9 is a diagram illustrating an example of a determination area according to the present modification. When the relative speed of the other vehicle 102 recognized by the recognition unit 411 is equal to or higher than a threshold and the position of the other vehicle 102 at a predetermined time point (a time point after the current time point) is included in the determination areas RLA, RRA, the determination unit 414 predicts that the other vehicle 102 passes the side of the subject vehicle 101 and determines to correct the target path. In the determination areas RLA, RRA, the length in the front-rear direction is RDL, and the length in the left-right direction is RDW. Since RDW, RDL are set similarly to DW, DL, the description thereof will be omitted. As similar to LA, RA, the determination areas RLA, RRA may be three-dimensional areas having a height instead of two-dimensional areas. Of the determination areas RLA, RRA, an area within a distance RIL from the rear end of the subject vehicle 101 is set as a correction prohibition area. The distance RIL may be the same length as the distance IL, or a value different from the distance IL may be set.

Figure 10:
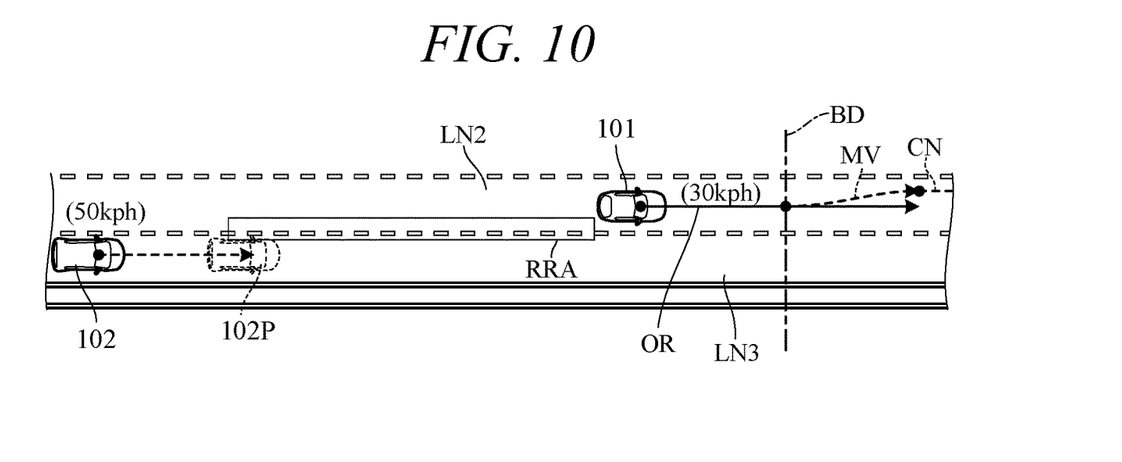
FIG. 10 is a diagram illustrating an example of a scene where another vehicle passes a side of the vehicle.

FIG. 10 is a diagram illustrating an example of a scene where the other vehicle passes the side of the subject vehicle. FIG. 10 illustrates the subject vehicle 101 traveling on the lane LN2 and the other vehicle 102 traveling on the lane LN3. It is assumed that the traveling speed of the subject vehicle 101 is 30 kph and the traveling speed of the other vehicle 102 is 50 kph. That is, the relative speed of the other vehicle 102 with respect to the subject vehicle 101 is 20 kph (=50 kph −30 kph). A solid arrow line OR in the drawing represents a target path from the current time to a predetermined time T ahead of the subject vehicle 101. The other vehicle 102P drawn by a broken line in the drawing schematically represents the other vehicle 102 at a predetermined time point. The predetermined time point is a time point that is a second predetermined time (<first predetermined time) ahead from the current time point. As similar to FIG. 5A, a boundary BD is set at the position of a distance RIL from the subject vehicle 110.

In the example illustrated in FIG. 10, since a part of the other vehicle 102P is included in the determination area RRA, when the relative speed of the other vehicle 102 with respect to the subject vehicle 101 is equal to or higher than the threshold, the target path OR is corrected to the target path indicated by the broken arrow line MV. When the TTC is considered together with the relative speed, the target path OR is corrected to the target path indicated by the broken arrow line MV when the relative speed is equal to or higher than the first threshold and the TTC is less than the second threshold. A broken line CN in the drawing represents a correction continuation path. In FIG. 10, the determination area RLA is not illustrated.

As illustrated in FIG. 10, when the other vehicle 102 passes the side of the subject vehicle 101, the target path of the subject vehicle 101 is corrected in a direction away from the other vehicle 102 in the vehicle width direction. At this time, if the other vehicle is present in the other adjacent lane LN1, the subject vehicle 101 may approach the other vehicle. Therefore, in the present modification, in step S12, it is determined whether or not the first other vehicle passes the side of the subject vehicle 101 in addition to whether or not the subject vehicle 101 passes the side of the first other vehicle. When it is determined that the subject vehicle 101 passes the side of the first other vehicle or when it is determined that the first other vehicle passes the side of the subject vehicle 101, the processing proceeds to step S13. As a result, the driving path can be corrected in a more appropriate manner according to the surrounding situation of the vehicle.

In the above embodiment, the example in which the target path of the vehicle 101 is corrected with the lane adjacent to one side of the lane LN2 on which the subject vehicle 101 travels as the lane LN3, the vehicle 102 traveling on the lane LN3 as the first other vehicle, the lane adjacent to the other side of the lane LN2 as the lane LN1, and the vehicle 103 traveling on the lane LN1 as the second other vehicle has been described. However, the target path of the vehicle 101 may be corrected with the lane adjacent to one side of the lane LN2 as the lane LN1, the vehicle 103 traveling on the lane LN1 as the first other vehicle, the lane adjacent to the other side of the lane LN2 as the lane LN3, and the vehicle 102 traveling on the lane LN3 as the second other vehicle.

In the above embodiment, the recognition unit 411 recognizes the surrounding vehicles (the other vehicles 102, 103) of the subject vehicle 101 and the travel situation of the surrounding vehicle based on the image data and the like from the camera 11, but the configuration of the recognition unit is not limited thereto. For example, the recognition unit may recognize a surrounding vehicle of the subject vehicle 101 and a traveling situation of the surrounding vehicle based on information received via the communication unit 37 by road-to-vehicle communication, vehicle-to-vehicle communication, or the like.

The present invention can be configured as a travel control method including: recognizing a surrounding situation of a subject vehicle; generating a target path of the subject vehicle according to the surrounding situation recognized in the recognizing; calculating a correction amount for correcting the target path generated in the generating in a direction away from a first other vehicle in the vehicle width direction, the first other vehicle traveling in a first adjacent lane in which a traveling direction is the same as a traveling direction of a subject lane on which the subject vehicle travels and which is adjacent to one side of the subject lane, when the first other vehicle is recognized in the recognizing and the subject vehicle is predicted to pass a side of the first other vehicle or the first other vehicle is predicted to pass a side of the subject vehicle; when a first other vehicle is recognized in the recognizing, the first other vehicle traveling in a first adjacent lane which is adjacent to one side of a subject lane on which the subject vehicle travels and whose traveling direction is the same as a traveling direction of the subject lane, and when the subject vehicle is predicted to pass through the side of the first other vehicle, or when the first other vehicle is predicted to pass through the side of the subject vehicle, calculating a correction amount for correcting the target path generated in the generating in a direction away from the first other vehicle in a vehicle width direction; determining whether to correct the target path based on a traveling situation of a second other vehicle traveling in a second adjacent lane which is adjacent to another side of the subject lane when the second other vehicle traveling in the second adjacent lane is recognized in the recognizing; and correcting the target path based on the correction amount calculated in the calculating when the target path is determined to be corrected in the determining.

when a first other vehicle is recognized in the recognizing, the first other vehicle traveling in a first adjacent lane which is adjacent to one side of a subject lane on which the subject vehicle travels and whose traveling direction is the same as a traveling direction of the subject lane, and when the subject vehicle is predicted to pass through the side of the first other vehicle, or when the first other vehicle is predicted to pass through the side of the subject vehicle, calculating a correction amount for correcting the target path generated in the generating in a direction away from the first other vehicle in a vehicle width direction.

determining whether to correct the target path based on a traveling situation of a second other vehicle traveling in a second adjacent lane which is adjacent to another side of the subject lane when the second other vehicle traveling in the second adjacent lane is recognized in the recognizing;

and correcting the target path based on the correction amount calculated in the calculating when the target path is determined to be corrected in the determining.

The above embodiment can be combined as desired with one or more of the above modifications. The modifications can also be combined with one another.

The present invention can correct the driving path of the vehicle in an appropriate manner according to the surrounding situation of the vehicle.

Above, while the present invention has been described with reference to the preferred embodiments thereof, it will be understood, by those skilled in the art, that various changes and modifications may be made thereto without departing from the scope of the appended claims.

What is claimed is:

1. A vehicle control system comprising
a sensor configured to detect an external situation around a subject vehicle,
an actuator for traveling, and
a microprocessor and a memory connected to the microprocessor, wherein
the microprocessor is configured to perform:
utilizing data generated by the sensor to calculate a surrounding situation of the subject vehicle;
generating a target path of the subject vehicle according to the surrounding situation;
calculating a correction amount for correcting the target path in a direction away from a first other vehicle in a vehicle width direction, the first other vehicle traveling in a first adjacent lane in which a traveling direction is the same as a traveling direction of a subject lane on which the subject vehicle travels and which is adjacent to one side of the subject lane, when the first other vehicle is recognized based on the surrounding situation and the subject vehicle is predicted to pass a side of the first other vehicle or the first other vehicle is predicted to pass a side of the subject vehicle;
when a second other vehicle traveling in a second adjacent lane which is adjacent to another side of the subject lane is recognized based on the surrounding situation, determining whether to correct the target path based on a traveling situation of the second other vehicle;

correcting the target path based on the correction amount calculated in the calculating when the target path is determined to be corrected; and
controlling the actuator so that the subject vehicle automatically travels along the target path.

2. The vehicle control system according to claim 1, wherein
the microprocessor is configured to perform:
predicting a first distance between the subject vehicle and the second other vehicle in the vehicle width direction and a second distance between the subject vehicle and the second other vehicle in the traveling direction when the subject vehicle travels along the target path corrected based on the traveling situation of the second other vehicle,
determining to correct the target path when the first distance is equal to or more than a first predetermined value or the second distance is equal to or more than a second predetermined value, and
determining not to correct the target path when the first distance is less than the first predetermined value and the second distance is less than the second predetermined value.

3. The vehicle control system according to claim 2, wherein
the microprocessor is configured to perform, when the second adjacent lane is an opposite lane and a separation zone is provided between the subject lane and the opposite lane, determining to correct the target path even if the first distance is less than the first predetermined value and the second distance is less than the second predetermined value.

4. The vehicle control system according to claim 2, wherein
the microprocessor is configured to perform determining to correct the target path when a third distance between the subject vehicle and the second other vehicle in the vehicle width direction when the second other vehicle is recognized based on the surrounding situation is equal to or more than a third predetermined value or a fourth distance between the subject vehicle and the second other vehicle in the traveling direction when the second other vehicle is recognized based on the surrounding situation is equal to or more than a fourth predetermined value.

5. The vehicle control system according to claim 1, wherein
the microprocessor is configured to perform
setting, as a correction target area of the target path, a section between a first point at which the subject vehicle reaches a first predetermined time ahead and a second point at which the subject vehicle reaches a second predetermined time ahead, the second predetermined time being shorter than the first predetermined time, and
determining to correct the target path when a position of the first other vehicle after the second predetermined time is predicted to be included in the correction target area and a relative speed of the subject vehicle with respect to the first other vehicle is equal to or higher than a predetermined speed.

6. The vehicle control system according to claim 5, wherein,
the predetermined speed is a first threshold value, and
the microprocessor is configured to perform, when a time to collision of the subject vehicle with the first other vehicle is less than a second threshold value, determining not to correct the target path even if the position of the first other vehicle after the second predetermined time is predicted to be included in the correction target area and the relative speed of the subject vehicle with respect to the first other vehicle is equal to or higher than the first threshold value.

7. The vehicle control system according to claim 5, wherein, the microprocessor is further configured to perform setting, as a correction prohibition area of the target path, a section between a current position of the subject vehicle and the second point, and determining not to correct the target path when the position of the first other vehicle after the second predetermined time is predicted to be included in the correction prohibition area.

8. A vehicle control system comprising a sensor configured to detect an external situation around a subject vehicle, an actuator for traveling, and a microprocessor and a memory connected to the microprocessor, wherein the microprocessor is configured to function as:

a recognition unit configured to utilize data generated by the sensor to calculate a surrounding situation of the subject vehicle;

a generation unit configured to generate a target path of the subject vehicle according to the surrounding situation;

a calculation unit configured to calculate a correction amount for correcting the target path generated by the generation unit in a direction away from a first other vehicle in a vehicle width direction, the first other vehicle traveling in a first adjacent lane in which a traveling direction is the same as a traveling direction of a subject lane on which the subject vehicle travels and which is adjacent to one side of the subject lane, when the first other vehicle is recognized based on the surrounding situation and the subject vehicle is predicted to pass a side of the first other vehicle or the first other vehicle is predicted to pass a side of the subject vehicle;

a determination unit configured to, when a second other vehicle traveling in a second adjacent lane which is adjacent to another side of the subject lane is recognized based on the surrounding situation, determine whether to correct the target path based on a traveling situation of the second other vehicle;

a correction unit configured to correct the target path based on the correction amount calculated by the calculation unit when the target path is determined to be corrected by the determination unit; and a driving control unit configured to control the actuator so that the subject vehicle automatically travels along the target path.

9. The vehicle control system according to claim 8, wherein the determination unit is configured to predict a first distance between the subject vehicle and the second other vehicle in the vehicle width direction and a second distance between the subject vehicle and the second other vehicle in the traveling direction when the subject vehicle travels along the target path corrected by the correction unit based on the traveling situation of the second other vehicle, determine to correct the target path when the first distance is equal to or more than a first predetermined value or the second distance is equal to or more than a second predetermined value, and determine not to correct the target path when the first distance is less than the first predetermined value and the second distance is less than the second predetermined value.

10. The vehicle control system according to claim 9, wherein the determination unit is configured to, when the second adjacent lane is an opposite lane and a separation zone is provided between the subject lane and the opposite lane, determine to correct the target path even if the first distance is less than the first predetermined value and the second distance is less than the second predetermined value.

11. The vehicle control system according to claim 9, wherein the determination unit is configured to determine to correct the target path when a third distance between the subject vehicle and the second other vehicle in the vehicle width direction when the second other vehicle is recognized based on the surrounding situation is equal to or more than a third predetermined value or a fourth distance between the subject vehicle and the second other vehicle in the traveling direction when the second other vehicle is recognized based on the surrounding situation is equal to or more than a fourth predetermined value.

12. The vehicle control system according to claim 8, wherein the determination unit is configured to set, as a correction target area of the target path, a section between a first point at which the subject vehicle reaches a first predetermined time ahead and a second point at which the subject vehicle reaches a second predetermined time ahead, the second predetermined time being shorter than the first predetermined time, and determine to correct the target path when a position of the first other vehicle after the second predetermined time is predicted to be included in the correction target area and a relative speed of the subject vehicle with respect to the first other vehicle is equal to or higher than a predetermined speed.

13. The vehicle control system according to claim 12, wherein, the predetermined speed is a first threshold value, and the determination unit is configured to, when a time to collision of the subject vehicle with the first other vehicle is less than a second threshold value, determine not to correct the target path even if the position of the first other vehicle after the second predetermined time is predicted to be included in the correction target area and the relative speed of the subject vehicle with respect to the first other vehicle is equal to or higher than the first threshold value.

14. The vehicle control system according to claim 12, wherein, the microprocessor is further configured to perform the determination unit is configured to further set, as a correction prohibition area of the target path, a section between a current position of the subject vehicle and the second point, and determine not to correct the target path when the position of the first other vehicle after the second predetermined time is predicted to be included in the correction prohibition area.

15. A travel control method of a vehicle control system comprising a sensor configured to detect an external situation around a subject vehicle, and an actuator for traveling, the method comprising utilizing data generated by the sensor to calculate a surrounding situation of the subject vehicle;

generating a target path of the subject vehicle according to the surrounding situation;

calculating a correction amount for correcting the target path in a direction away from a first other vehicle in a vehicle width direction, the first other vehicle traveling in a first adjacent lane in which a traveling direction is the same as a traveling direction of a subject lane on which the subject vehicle travels and which is adjacent to one side of the subject lane, when the first other vehicle is recognized based on the surrounding situation and the subject vehicle is predicted to pass a side of the first other vehicle or the first other vehicle is predicted to pass a side of the subject vehicle;

when a second other vehicle traveling in a second adjacent lane which is adjacent to another side of the subject lane is recognized based on the surrounding situation, determining whether to correct the target path based on a traveling situation of the second other vehicle;

correcting the target path based on the correction amount calculated in the calculating when the target path is determined to be corrected; and controlling the actuator so that the subject vehicle automatically travels along the target path.

* * * * *